ary heading# UNITED STATES PATENT OFFICE.

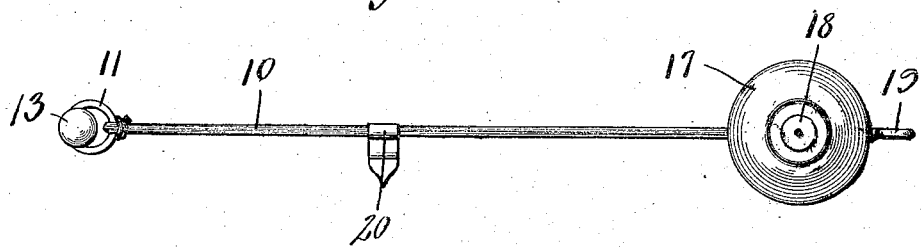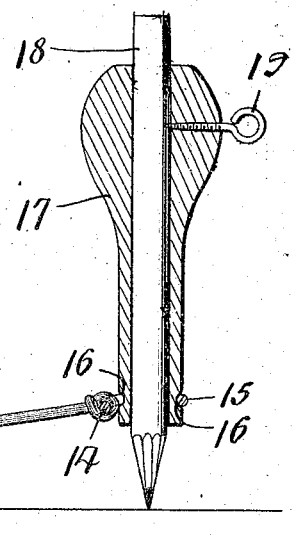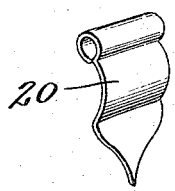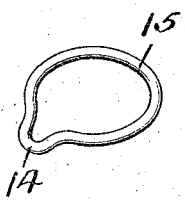

GEORGE FENSKE, OF WALSENBURG, COLORADO.

PANTOGRAPH.

1,166,827.  Specification of Letters Patent.  Patented Jan. 4, 1916.

Application filed May 4, 1915. Serial No. 25,765.

*To all whom it may concern:*

Be it known that I, GEORGE FENSKE, a citizen of the United States, residing at Walsenburg, in the county of Huerfano and State of Colorado, have invented new and useful Improvements in Pantographs, of which the following is a specification.

An object of the invention is to provide an instrument for use in making enlarged sketches or copies of pictures, maps, cartoons and other matter.

The invention contemplates, among other features, the provision of an instrument which is employed for reproducing from a copy and upon a different or larger scale, the reproduction being made with the use of a stylus or pencil keyed to a member supporting a pointer and which presses over the original or copy from which the reproduction is to be made.

In the further disclosure of the invention reference is to be had to the accompanying drawings, constituting a part of this specification, in which similar characters of reference denote corresponding parts in all the views, and in which:

Figure 1 is a plan view of the pantograph, the device being shown in position for use; and Fig. 2 is a vertical longitudinal sectional view taken through the pantograph. Fig. 3 is a perspective view of the pointer; Fig. 4 is a perspective view of the swivel ring-like member.

Referring more particularly to the views, I provide an elastic 10 to one end of which is secured a ring 11, said ring being adapted to be held in position upon a drawing board 12 or other surface by means of a suitable tack or pin 13. The other end of the elastic 10 passes through a diametrical projection 14 formed with an integral continuous swivel member 15 arranged to freely rotate in an annular groove 16 in the lower end of a holder 17. The holder is of a tubular nature and is adapted to slidably receive a pencil or other suitable stylus 18 which is secured in the desired position within the holder by a screw eye 19 threaded into the holder and adapted to bear against the periphery of the pencil as clearly shown. Supported on the elastic 10 between the ring 11 and the holder 17 is a pointer 20 preferably formed of a single piece of metal, said pointer having its inner end looped around the elastic 10 as shown. The pointer is frictionally held from sliding on the elastic, but by pulling upon the pointer it can be advanced or retreated along the elastic to move the pointer toward or away from the ring 11 as desired.

In the use of the device described the ring 11 is secured upon the drawing board as mentioned, and the pointer is then arranged upon the elastic a suitable distance away from the ring 11, the distance between the ring 11 and the pointer determining the size of the reproduction. The holder 17 is now grasped in the hand, and, holding the same vertically so that it will aline with the elastic 10, the pointer and holder are simultaneously moved to trace over the lines of the copy which is to be reproduced, thus resulting in the reproduction of the copy by the writing end of the pencil in a larger scale, as will be clearly seen by referring to the views.

By having the swivel member 15 mounted to loosely rotate upon the holder 17 as mentioned, it will be clear that the position of the holder need not be changed to the extent of causing the holder to be turned so as not to wind up a portion of the elastic thereon, as this would spoil the reproduction and bring about an inaccurate result, the holder being always held vertically, with the elastic extending laterally from it while the different positions that the holder might assume with respect to the ring 11 will not result in an inaccurate reproduction due to the provision of the swivel member and which rotates freely upon the holder and has connection with the elastic, as described.

The enlarging instrument or pantograph described affords a cheap and compact means which can be readily carried in the pocket and easily placed in position for use, the same being particularly adapted for use in school rooms in outlining maps, pictures, etc., on blackboards or on paper.

Having thus described my invention, I claim:

A pantograph comprising a tubular member formed with an external surface providing a handle, a marking element slidable in the tubular member, a set screw threaded in the tubular member for engaging the element to lock the same therein, the said tubular member being formed with an annular groove near its lower end, a ring swiveled in said groove and having an offset eye extension, an elastic cord fastened to the eye extension and having a ring at its free end adapted for connection with a permanent fastener, and a pointer having a sleeve portion frictionally embracing the said cord.

In testimony whereof I affix my signature in presence of two witnesses.

GEORGE FENSKE.

Witnesses:
E. W. KRIER,
JOHN BERARD